Patented Jan. 4, 1927.

1,613,137

UNITED STATES PATENT OFFICE.

WILLIAM R. SEIGLE, OF MAMARONECK, NEW YORK, ASSIGNOR TO JOHNS-MANVILLE, INCORPORATED, OF NEW YORK, N. Y., A CORPORATION OF NEW YORK.

HEAT-INSULATING MATERIAL AND METHOD OF MAKING IT.

No Drawing.   Application filed November 25, 1925. Serial No. 71,435.

The object of my invention is the production of heat insulating material, moldable into brick or other shapes, of porous structure and light weight and capable of withstanding without deterioration the high temperatures often encountered at the present day in steam drums and pipes containing high pressure superheated steam.

The composition which forms the basis of my new heat insulating material is finely divided aluminum silicate, obtainable as "fossil earth" or "diatomaceous earth", in which a small percentage of the colloidal earth known as bentonite is intimately mixed in the manner hereinbelow described. Since bricks or other shapes made from this basis, though functionally and practically effective, are undesirably liable to fracture during handling, I add to the basis-composition a variable, though preferably small, quantity of refractory fibrous binding material, such as asbestos fiber.

The method by which my insulating material can, according to my experience, be best made, is as follows:

First: Prepare bentonite for its subsequent mixture with the diatomaceous earth, by introducing it into a tank of boiling water,—about one pound bentonite (dry) to eight pounds of water,—maintaining the agitation by boiling until the bentonite and water are completely and mutually associated, forming a disperse system.

Second: Introduce into about 10,000 pounds of water in a suitable tank, 1200 pounds of the previously prepared waterextension of bentonite, thus further extending the bentonite in suspension, agitating the whole preferably by means of air jets forced into the water until the extension or dilution of the bentonite is complete and uniform.

Third: Add to the bentonite extension produced by the second step above described, 90 pounds of asbestos fiber, maintaining agitation until the fiber is thoroughly and uniformly distributed through the mass.

(The addition of asbestos fiber is recommended, for the reason that the final moulded product is thereby made mechanically stronger than will be the case if no fibrous binder or strenthener is provided. It may, however, be dispensed with, and a practically useful and manipulable heat insulating block be nevertheless produced.)

Fourth: Add to the bentonite-asbestoswater mix, as above described (or to the bentonite-water mix as described under the second head above) 2760 pounds of diatomaceous earth, preferably gradually, maintaining air jet agitation until this ingredient also is thoroughly intermixed, incorporated, and mutually distributed in the mix, in relation to the other solid component or components.

The mix thus produced is then forced under air pressure from the mixing tank into filter-molds in the usual manner, and the water filtered out in the molds under air pressure of about fifty pounds to the square inch.

As good results can be secured by gradually adding dry bentonite (150 pounds) to 10,000 pounds of water kept boiling as by means of steam jets, in the mixing tank, and thereafter adding asbestos fiber (as preferred and if desired) and diatomaceous earth, in succession, in the proportions above stated, agitating either by maintenance of ebullition or by air jet.

The above stated proportions may be to some extent varied. Considerable experience indicates that the best proportions of the solids used are: Diatocaceous earth, 92%, bentonite, 5%; asbestos fiber, 3%. The water proportion is variable, and should be as small as is consistent with facility in transferring to and filling molds.

The insulating blocks or shapes produced by following the above specifications, when still moist, are strong and to a limited degree elastic or "rubbery"; when dried (two or three days in a dryer temperature about 275° F. suffices to dry them thoroughly) they may be cut or shaped, are of light weight (about 25 lbs. per cubic foot) mechanically strong, possess high heat insulating property, and immunity to temperatures up to and even exceeding 1500° F. The shrinkage is small and uniform, so that losses by warping are inconsiderable.

I claim:

1. The method of making heat-resistant insulating blocks comprising as steps the formation of a disperse system of bentonite and water while maintaining ebullition of the water, adding diatomaceous earth to said disperse system and subsequently molding blocks by expression of water from association with the solids.

2. The method of making heat-resistant insulating blocks comprising as steps the formation of a disperse system of bentonite and water while maintaining ebullition of the water, adding diatomaceous earth to said disperse system while agitating the same by air jets, and subsequently molding blocks by expression of water from association with the solids.

3. The method of making heat-resistant insulating blocks comprising as steps the formation of a disperse system of bentonite and water while maintaining ebullition of the water, adding heat-refractory fibre and diatomaceous earth to said disperse system and subsequently molding blocks by expression of water from association with the solids.

4. The method of making heat-resistant insulating blocks comprising as steps the formation of a disperse system of bentonite and water while maintaining ebullition of the water, adding heat-refractory fibre and diatomaceous earth to said disperse system while agitating the same by air jets and subsequently molding blocks by expression of water from association with the solids.

Signed by me at New York, N. Y., this 19th day of November 1925.

WILLIAM R. SEIGLE.